United States Patent [19]
Inomata

[11] Patent Number: 4,563,513
[45] Date of Patent: Jan. 7, 1986

[54] METHOD FOR THE PREPARATION OF A LOW-IMPURITY ORGANOPOLYSILOXANE BY THE POLYMERIZATION OF AN ORGANOPOLYSILOXANE OLIGOMER

[75] Inventor: Hiroshi Inomata, Gunma, Japan

[73] Assignee: Shin-Etsu Chemical Co., Ltd., Tokyo, Japan

[21] Appl. No.: 641,454

[22] Filed: Aug. 16, 1984

[30] Foreign Application Priority Data

Aug. 29, 1983 [JP] Japan ................................. 58-157539

[51] Int. Cl.$^4$ ............................................. C08G 77/06
[52] U.S. Cl. ........................................ 528/14; 528/18; 528/33; 556/462
[58] Field of Search ..................... 556/462; 528/14, 18, 528/33

[56] References Cited

U.S. PATENT DOCUMENTS 3,057,821 10/1962 Boot ...................................... 528/14
3,065,203 11/1962 Bruner ................................. 528/14

Primary Examiner—Melvyn I. Marquis
Attorney, Agent, or Firm—Toren, McGeady, Stanger, Goldberg & Kiel

[57] ABSTRACT

The invention provides a novel method for the neutralization of the residual alkali catalyst following alkali-catalyzed polymerization of an organopolysiloxane oligomer to produce a high-polymeric organopolysiloxane, according to which the organopolysiloxane after completion of the polymerization reaction is admixed with a trihydrocarbyl monohalosilane, e.g. trimethyl chlorosilane, and a hexahydrocarbyl disilazane, e.g. hexamethyl disilazane, in combination as the neutralizing agent so that the neutralization is very complete and still the product organopolysiloxane contains very little impurities of alkali and halogen.

2 Claims, No Drawings

METHOD FOR THE PREPARATION OF A LOW-IMPURITY ORGANOPOLYSILOXANE BY THE POLYMERIZATION OF AN ORGANOPOLYSILOXANE OLIGOMER

BACKGROUND OF THE INVENTION

The present invention relates to a method for the preparation of a low-impurity organopolysiloxane by the polymerization of an organopolysiloxane oligomer or, more particularly, to a method for the preparation of a high-polymeric organopolysiloxane outstandingly free from impurities such as alkalis, acids and halogens by the alkali-catalyzed polymerization of an organopolysiloxane oligomer.

As is well known, high-polymeric organopolysiloxanes are prepared usually by the polymerization of an oligomeric organopolysiloxane or a mixtures of oligomeric organopolysiloxanes obtained by the hydrolysis of an organohalosilane or a mixture of organohalosilanes followed by the dehydration condensition. The polymerization of the oligomeric organopolysiloxane proceeds by the siloxane rearrangement in the presence of an alkali catalyst. The alkali catalyst must be neutralized after completion of the polymerization since otherwise even a trace amount of alkali may adversely act on the organopolysiloxane product to cause depolymerization thereof. Various compounds have been proposed as the neutralizing agent of the residual alkali catalyst including, for example, ammonium halides proposed in U.S. Pat. No. 3,057,821 and $\alpha$-halohydrins proposed in U.S. Pat. No. 3,065,203.

These neutralizing agents, however, have their respective disadvantages and problems. For example, the ammonium halides are hardly miscible with organopolysiloxanes so that the neutralization reaction cannot be complete. Organopolysiloxanes obtained by the neutralization with an $\alpha$-halohydrin sometimes suffer from poor heat stability and corrosiveness against metals in contact therewith due to the significantly high level of the halogen impurities originating from the neutralizing agent.

Along with the recent development in the electronics technology, the organopolysiloxane compositions used in the protective encapsulation and insulating sealing of the electronic devices and instruments are required to be as free as possible from any impurities not only of the alkalis used as the polymerization catalyst but also of acids and halogens originating in the neutralizing agent in order to ensure high and durable performance of the device and instrument. In this regard, none of the hitherto proposed neutralizing agents is quite satisfactory.

SUMMARY OF THE INVENTION

It is therefore an object of the present invention to provide a novel and improved method for the preparation of a high-polymeric organopolysiloxane outstandingly free from any impurities including not only the alkali catalyst but also acids and halogens originating in the neutralizing agent of the alkali catalyst used in the alkali-catalyzed polymerization of an oligomeric organopolysiloxane.

Thus, the method of the present invention for the preparation of a low-impurity organopolysiloxane comprises the steps of:

(a) polymerizing an organopolysiloxane oligomer in the presence of an alkali catalyst to form a high-polymeric organopolysiloxane; and
(b) admixing the organopolysiloxane containing the alkali catalyst with a trihydrocarbyl monohalosilane and a hexahydrocarbyl disilazane in combination to neutralize the alkali catalyst.

DETAILED DESCRIPTION OF THE PREFERRED EMBODIMENTS

The organopolysiloxane oligomer as the starting material in the inventive method is obtained by the hydrolysis of an organohalosilane or a mixture of organohalosilanes followed by the dehydration condensation. The oligomer has either a cyclic or a straight or branched chain-like molecular configuration having silicon atoms in a molecule rarely exceeding 10 in number though dependent on the formulation and conditions of the preparation.

The step (a) in the inventive method is well known in the art of silicones. That is, the organopolysiloxane oligomer or a mixture of oligomers of different types is admixed with a small amount of an alkali catalyst such as sodium hydroxide, potassium hydroxide and potassium silanolate together with or without an organic solvent and the mixture is heated at an elevated temperature of, for example, 100° to 180° C. to effect the alkali-catalyzed reaction of siloxane rearrangement to equilibrium. The amount of the alkali catalyst, assuming that it is potassium hydroxide or silanolate, is usually in the range to give a Si/K molar ratio from 0.1 to $50 \times 10^3$. In this manner, various types of high-polymeric organopolysiloxanes are formed as composed of the siloxane units of $R_3SiO_{0.5}$, $R_2SiO$, $RSiO_{1.5}$ and $SiO_2$, each R being a substituted or unsubstituted monovalent hydrocarbon group independently from the others.

The step (b) to follow the above described step (a) is the neutralization of the alkali catalyst remaining in the organopolysiloxane which is performed by admixing the organopolysiloxane with a trihydrocarbyl monohalosilane and a hexahydrocarbyl disilazane in combination.

The trihydrocarbyl monohalosilane above mentioned is a compound represented by the general formula $R^1{}_3SiX$, in which each $R^1$ is a substituted or unsubstituted monovalent hydrocarbon group exemplified by alkyl groups such as methyl, ethyl and propyl groups, alkenyl groups such as vinyl and allyl groups and aryl groups such as phenyl and tolyl groups as well as those substituted groups derived therefrom by the replacement of one or more hydrogen atoms therein with halogen atoms, cyano groups and the like such as chloromethyl and 3,3,3-trifluoropropyl groups and X is a halogen, e.g. chlorine, bromine and iodine, atom. Particularly suitable trihydrocarbyl monohalosilanes are trimethyl chlorosilane, vinyl dimethyl chlorosilane, trimethyl bromosilane, phenyl dimethyl iodosilane and the like though not limited thereto. Trimethyl chlorosilane is the most preferred. It is a desirable condition that the silane compound has a boiling point not excessively high or, preferably, at 200° C. or below in consideration of the requirement that the remaining amount of the silane compound after completion of the neutralization reaction, if any, should be removed away by distillation.

The amount of the trihydrocarbyl monohalosilane to be added to the high-polymeric organopolysiloxane should be at least equimolar to the alkali catalyst remaining therein and the molar ratio of the silane to the alkali is preferably in the range from 1.0 to 5.0 or, more preferably, from 1.2 to 2.0.

The above described trihydrocarbyl monohalosilane is added to the alkali-containing organopolysiloxane in combination with a hexahydrocarbyl disilazane either separately or as a mixture of the two prepared in advance. The hexahydrocarbyl disilazane is a compound represented by the general formula $(R^2_3Si)_2NH$, in which each $R^2$ is a substituted or unsubstituted monovalent hydrocarbon group which may be selected from the same class as for the group $R^1$ in the trihydrocarbyl monohalosilane. Particular examples of the hexahydrocarbyl disilazane include hexamethyl disilazane, 1,3-divinyl-1,1,3,3-tetramethyl disilazane, 1,3-diphenyl-1,1,3,3-tetramethyl disilazane and the like though not limited thereto. Hexamethyl disilazane is the most preferred. It is also desirable that this disilazane compound has a boiling point not exceeding 200° C. in consideration of the distillation removal of the remaining amount, if any, thereof after completion of the neutralization.

The amount of the hexahydrocarbyl disilazane to be added to the organopolysiloxane together with the trihydrocarbyl monohalosilane should be in the range from 0.2 to 10 moles or, preferably, from 0.5 to 2.0 moles per mole of the silane. When the amount of the disilazane compound is smaller than above, the resultant neutralized organopolysiloxane product may contain a small but not negligible amount of halogen impurities left unremoved.

The step (b) of the inventive method is the neutralization of the alkali-containing organopolysiloxane by the addition of the above described silane compound and the disilazane compound in combination. These two types of compounds may be added either separately or as a mixture prepared in advance. The neutralization reaction can proceed even at room temperature but it is preferable to agitate the mixture at an elevated temperature of, for example, 40° to 100° C. so that the neutralization reaction is complete within several hours. It is of course that the temperature should not be excessively high in order to prevent the silane compound and the disilazane compound from dissipation by vaporization. At least, the temperature should not be higher than the boiling points of the silane and disilazane compounds.

After completion of the neutralization reaction, the byproduct salt precipitated in the organopolysiloxane is removed by filtration and the remaining amounts, if any, of the silane and disilazane compounds are distilled away together with the solvent, if any, and the low-boiling fraction of the organopolysiloxane formed in the polymerization reaction. It is optional that the organopolysiloxane as neutralized is diluted with an organic solvent when it has an excessively high consistency to cause difficulties in the filtration of the precipitates.

In the following, examples are given to illustrate the inventive method and the effectiveness thereof in more detail.

EXAMPLE 1

A mixture of three types of organopolysiloxane oligomers composed of 114.7 g of decamethyl tetrasiloxane, 38.2 g of a cyclic tetramer 1,3,5,7-tetravinyl-1,3,5,7-tetramethyl cyclotetrasiloxane and 4238 g of a mixture of cyclic tri- to hexamers of dimethylsiloxane units was admixed with 4.4 g of a potassium dimethylsilanolate with a KOH content of 5% by weight and the mixture was heated for 8 hours at 150° C. to effect the polymerization reaction.

After completion of the polymerization reaction, the reaction mixture was admixed with a mixture of 0.6 g of trimethyl chlorosilane and 2.4 g of hexamethyl disilazane and agitated for 2 hours at 55° C. to neutralize the alkaline catalyst followed by the removal of the byproduct salt precipitated therein by filtration and distillation stripping of the low-boiling constituents by heating for 8 hours at 150° to 160° C. under a reduced pressure of 2 mmHg to give a clear oily organopolysiloxane product having a viscosity of 400 centistokes at 25° C. The yield of the organopolysiloxane after stripping of the low-boiling constituents was 88.2% based on the total amount of the organopolysiloxane oligomers.

The chemical analysis of the product for the impurities of chlorine and potassium gave results of 0.1 ppm and 0.1 ppm, respectively.

For comparision, the same experimental procedure as above was repeated except that the silane and disilazane compounds were replaced with 3.2 g of ethylenechlorohydrin and the neutralization was performed at 110° to 120° C. for 4 hours under agitation. Processing of the reaction mixture in the same manner as above gave a clear oily organopolysiloxane product having a viscosity of 404 centistokes at 25° C. in a yield of 88.0%. The contents of impurities in this product were 18 ppm and 0.2 ppm for chlorine and potassium, respectively.

A further comparative experiment was undertaken in the same manner as above except that the neutralization of the alkali-catalyzed polymerization mixture was performed with addition of 57.7 g of a 10% aqueous solution of ammonium bromide followed by agitation for 3 hours at 70° C. The yield of the organopolysiloxane product was smaller than 70% after stripping of the low-boiling constituents indicating that the neutralization reaction had been incomplete.

EXAMPLE 2

A toluene solution containing 40% by weight of a resinous oligomeric organopolysiloxane was prepared by the hydrolysis of a mixture composed of 55% by moles of phenyl trichlorosilane, 20% by moles of methyl trichlorosilane and 25% by moles of dimethyl dichlorosilane. A 2667 g portion of this toluene solution was admixed with 2.8 g of a 10% aqueous solution of potassium hydroxide and heated under reflux for 5 hours to effect the polycondensation reaction with continuous removal of the water distillate formed by the dehydration condensation. The resultant toluene solution of the resinous organopolysiloxane was neutralized in two ways given below.

Firstly, a 266.7 g portion of the solution was admixed with 0.10 g of trimethyl chlorosilane and agitated for 2 hours at 55° C. followed by filtration of the precipitates and stripping of the low-boiling constituents including the solvent to give a clear resin which was solid at room temperature having a melt viscosity of 985 centipoise at 150° C. The content of residual chlorine therein was 37 ppm.

Secondly, another 266.7 g portion of the toluene solution was admixed with 0.10 g of trimethyl chlorosilane and 0.90 g of hexamethyl disilazane and the mixture was agitated for 2 hours at 50° C. followed by filtration and stripping of the low-boiling constituents in the same manner as above also to give a resinous organopolysiloxane. The content of residual chlorine therein was 0.8 ppm.

What is claimed is:

1. A method for the preparation of a low-impurity high-polymeric organopolysiloxane which comprises the steps of:
    (a) polymerizing an organopolysiloxane oligomer in the presence of an alkali catalyst to form a high-polymeric organopolysiloxane; and
    (b) admixing the organopolysiloxane containing the alkali catalyst with a trihydrocarbyl monohalosilane and hexamethyldisilazane in combination to neutralize the alkali catalyst, the amount of the trihydrocarbyl monohalosilane being from 1.0 to 5.0 moles per mole of the alkali remaining in the organopolysiloxane, and the amount of hexamethyldisilazane being from 0.2 to 10 moles per mole of the trihydrocarbyl monohalosilane.

2. The method as claimed in claim 1 wherein the trihydrocarbyl monohalosilane is trimethyl chlorosilane.

* * * * *